(12) United States Patent
Grant et al.

(10) Patent No.: US 11,753,837 B2
(45) Date of Patent: Sep. 12, 2023

(54) ROOFTOP RIGGING SUPPORT SYSTEM

(71) Applicant: Engineered Supply LLC, Bayport, MN (US)

(72) Inventors: Arlen P. Grant, Stillwater, MN (US); Ponsingh B. Devendran, Hayward, WI (US); Erling C. Grant, Preston, MN (US)

(73) Assignee: Engineered Supply LLC, Bayport, MN (US)

( * ) Notice: Subject to any disclaimer, the term of this patent is extended or adjusted under 35 U.S.C. 154(b) by 79 days.

(21) Appl. No.: 17/242,225

(22) Filed: Apr. 27, 2021

(65) Prior Publication Data

US 2022/0341199 A1    Oct. 27, 2022

(51) Int. Cl.
| | |
|---|---|
| *F16M 11/00* | (2006.01) |
| *E04G 21/32* | (2006.01) |
| *A62B 35/04* | (2006.01) |
| *F16M 13/02* | (2006.01) |
| *A62B 35/00* | (2006.01) |

(52) U.S. Cl.
CPC ........ *E04G 21/3295* (2013.01); *A62B 35/005* (2013.01); *A62B 35/0068* (2013.01); *A62B 35/04* (2013.01); *E04G 21/328* (2013.01); *F16M 13/02* (2013.01)

(58) Field of Classification Search
CPC .............. E04G 21/3295; E04G 21/328; E04G 21/3276; A62B 35/005; A62B 35/0068; A62B 35/04; F16M 13/02
See application file for complete search history.

(56) References Cited

U.S. PATENT DOCUMENTS

| | | | | |
|---|---|---|---|---|
| 1,423,998 | A * | 7/1922 | Camp ...................... | E04G 3/34 |
| | | | | 182/187 |
| 5,287,944 | A * | 2/1994 | Woodyard .............. | E04D 13/12 |
| | | | | 248/237 |
| 9,248,323 | B1 * | 2/2016 | Larsen ............... | A62B 35/0068 |
| 10,238,899 | B1 * | 3/2019 | Sherman ............ | A62B 35/0075 |
| 2010/0108442 | A1 * | 5/2010 | Ballantyne .......... | E04G 21/3276 |
| | | | | 182/129 |
| 2017/0259090 | A1 * | 9/2017 | Gaines ................. | F16M 13/022 |
| 2020/0277801 | A1 * | 9/2020 | Ballantyne .......... | E04G 21/3276 |

* cited by examiner

*Primary Examiner* — Amy J. Sterling
(74) *Attorney, Agent, or Firm* — Laabs Intellectual Property (57) ABSTRACT

In at least one embodiment, a rooftop rigging support system mounts to a roof a building for suspending a load under an eave of the building. In some embodiments, the rooftop rigging support system comprises an arm that extends outward over the eave and then back inward underneath the eave. In some embodiments, the arm is a generally rigid, non-articulating structure. In some embodiments, the arm can be manually pivoted between a deployed position reaching under the eave and a withdrawn position extending above the roof.

18 Claims, 12 Drawing Sheets

ROOFTOP RIGGING SUPPORT SYSTEM

BACKGROUND OF THE INVENTION

This invention relates to generally to building safety and rooftop rigging support systems, and more specifically to rooftop rigging support systems for suspending a person and/or some other load below a building's roof.

Multistory buildings typically require window washing, façade washing, or other maintenance on the exterior surfaces of the building's wall. To facilitate such work, conventional building davits are mounted to the roof of a building to suspend maintenance personnel, platforms, tools and/or related equipment down alongside the building's exterior wall. Davits work well on tall buildings having horizontal roof structures but are difficult to use on a sloped roof. Many buildings that are three to five stories tall have sloped, shingled roofs that cannot support a davit. There remains a need for novel support and suspension structures that allow for suspended maintenance on buildings having sloped roofs.

All US patents and applications and all other published documents mentioned anywhere in this application are incorporated herein by reference in their entirety.

Without limiting the scope of the invention a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided as well only for the purposes of complying with 37 C.F.R. 1.72. The abstract is not intended to be used for interpreting the scope of the claims.

BRIEF SUMMARY OF THE INVENTION

In some embodiments, a rooftop rigging support system mounts to a roof of a building for suspending a load under an eave of the building. In some embodiments, the rooftop rigging support system comprises an arm having a proximal end and a distal end. The proximal end is anchored to the roof. The arm extends outward over the eave, the arm extends back inward under the eave, and the distal end is situated underneath the eave. A suspension line extending from the arm's distal end suspends a load underneath the eave.

In some embodiments, a rooftop rigging support system mounts to a roof of a building for suspending a load under an eave of the building. In some embodiments, the rooftop rigging support system comprises an arm having a proximal end and a distal end. The proximal end is anchored to the roof. The arm extends outward over the eave and back inward under the eave to position the distal end underneath the eave. A suspension line extending from the arm's distal end suspends a load underneath the eave.

In some embodiments, the arm is manually pivotal between a deployed position and a withdrawn position. In the deployed position, the arm's distal end is underneath the eave. In the withdrawn position, the arm's distal end is above the roof.

In some embodiments, the arm's proximal end is anchored generally directly above the building's exterior wall.

In some embodiments, the arm is substantially rigid and non-articulating along the arm's full length between the proximal end and the distal end.

In some embodiments, a rigging comprises a body comprising a first portion, a second portion and a third portion, and a suspension line attached to the body. The first portion is arranged to engage an anchor supported by a building and the third portion is arranged to contact the building. The second portion is offset from the first portion and the third portion such that the body comprises a cavity between the first portion and the third portion. The body can be placed with a building eave oriented in the cavity. The suspension line can extend away from the body and support a worker.

In some embodiments, the first portion is arranged to rotatably engage a building anchor. In some embodiments, the anchor comprises a loop and the body comprises a pin extending through the loop.

In some embodiments, a locking bracket arranged to engage the body and the anchor. In some embodiments, the locking bracket comprises a slot arranged to receive the loop. In some embodiments, the locking bracket comprises a locking pin extending through the loop.

In some embodiments, the body comprises an extension member. In some embodiments, the extension member fixedly engaged with the body. In some embodiments, the extension member is attached to the first portion. In some embodiments, the extension member comprises a bumper. In some embodiments, the body comprises a cavity comprising a non-circular shape and the extension member comprises a complimentary non-circular cross-sectional shape.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE DRAWINGS

A detailed description of the invention is hereafter described with specific reference being made to the drawings.

DETAILED DESCRIPTION OF THE INVENTION

While this invention may be embodied in many different forms, there are described in detail herein specific embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

FIGS. 1-6 show an embodiment of a rooftop rigging support system 10. In some examples, rooftop rigging support system 10 is mountable to a roof 12 of a building 14 (e.g., residential apartments, condominiums, hotels, convention centers, schools, hospitals, assisted living facilities, commercial offices, warehouses, airport terminals, etc.). In some embodiments, building 14 comprises at least one of an exterior wall 16, a wall stud 18, a facade 20, and roof 12. Some embodiments of roof 12 comprise at least one of a truss 22, roof sheathing 24, shingles 26, and an eave 28. In some embodiments, eave 28 comprises at least one of a rafter tail 30, a fascia 32, a soffit 34, and a gutter 36. Some embodiments of eave 28 comprise a sloped portion 38 (e.g., FIGS. 1-5 and 7-9). Some embodiments of eave 28 comprise a generally level portion 40 (e.g., FIG. 6). In some embodiments, eave 28 comprises shingles 26.

In some embodiments, rooftop rigging support system 10 is used for suspending a load 42 under the eave 28 of building 14. Load 42 is schematically illustrated to represent any hanging mass or weight. Some examples of load 42 include a person, a window washer, a painter, a hanging platform, a harness, a mechanical ascender, tools, building materials, supplies, and/or various combinations thereof.

In some embodiments, as shown in FIGS. 1-5, rooftop rigging support system 10 is mountable to the sloped portion 38 of the roof 12. In some embodiments, as shown in FIG. 6, rooftop rigging support system 10 is mountable to the generally level portion 40 of the roof 12.

Figure 1:
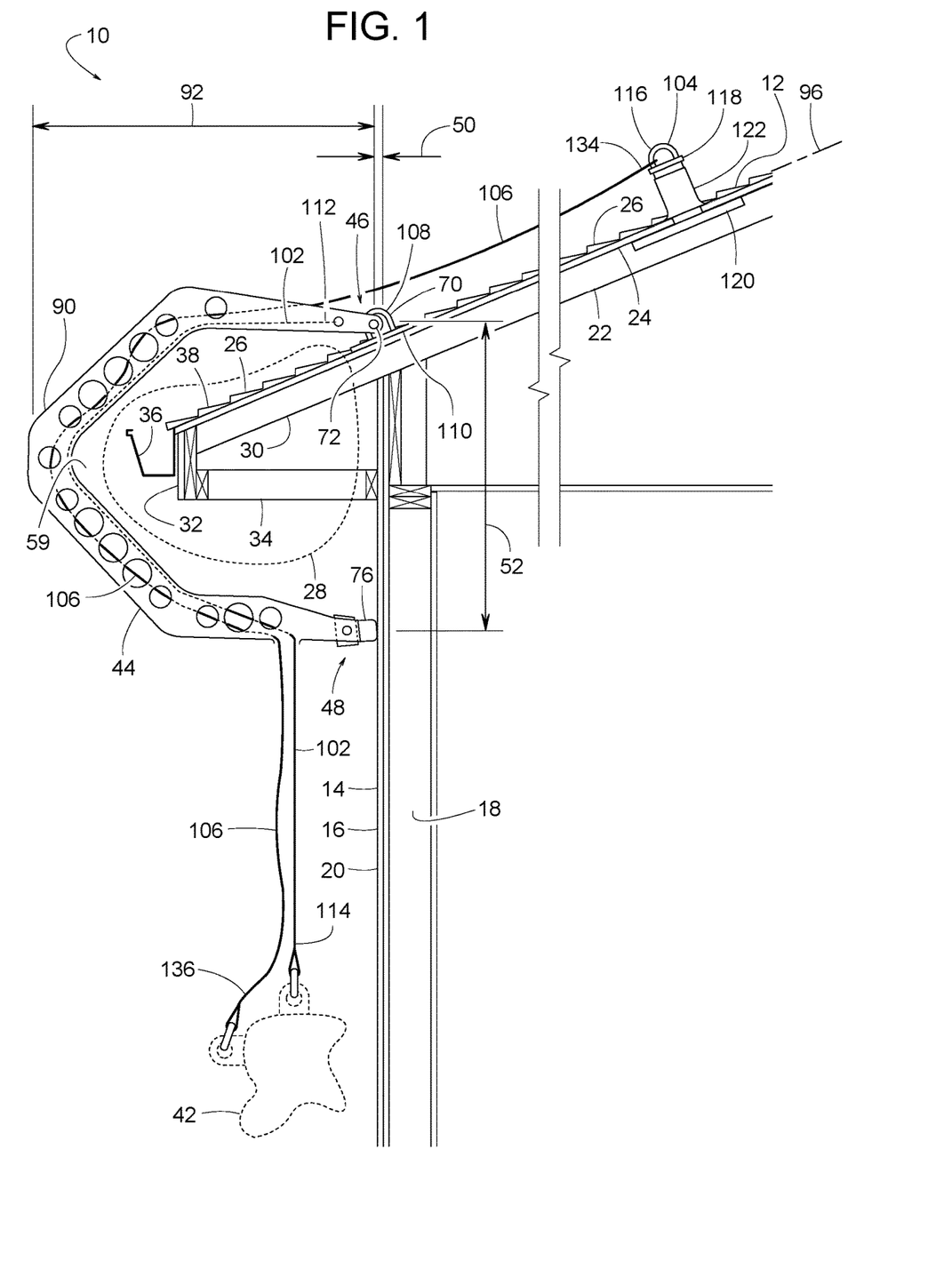
FIG. 1 shows an embodiment of a rooftop rigging support system in a deployed position.
Figure 6:
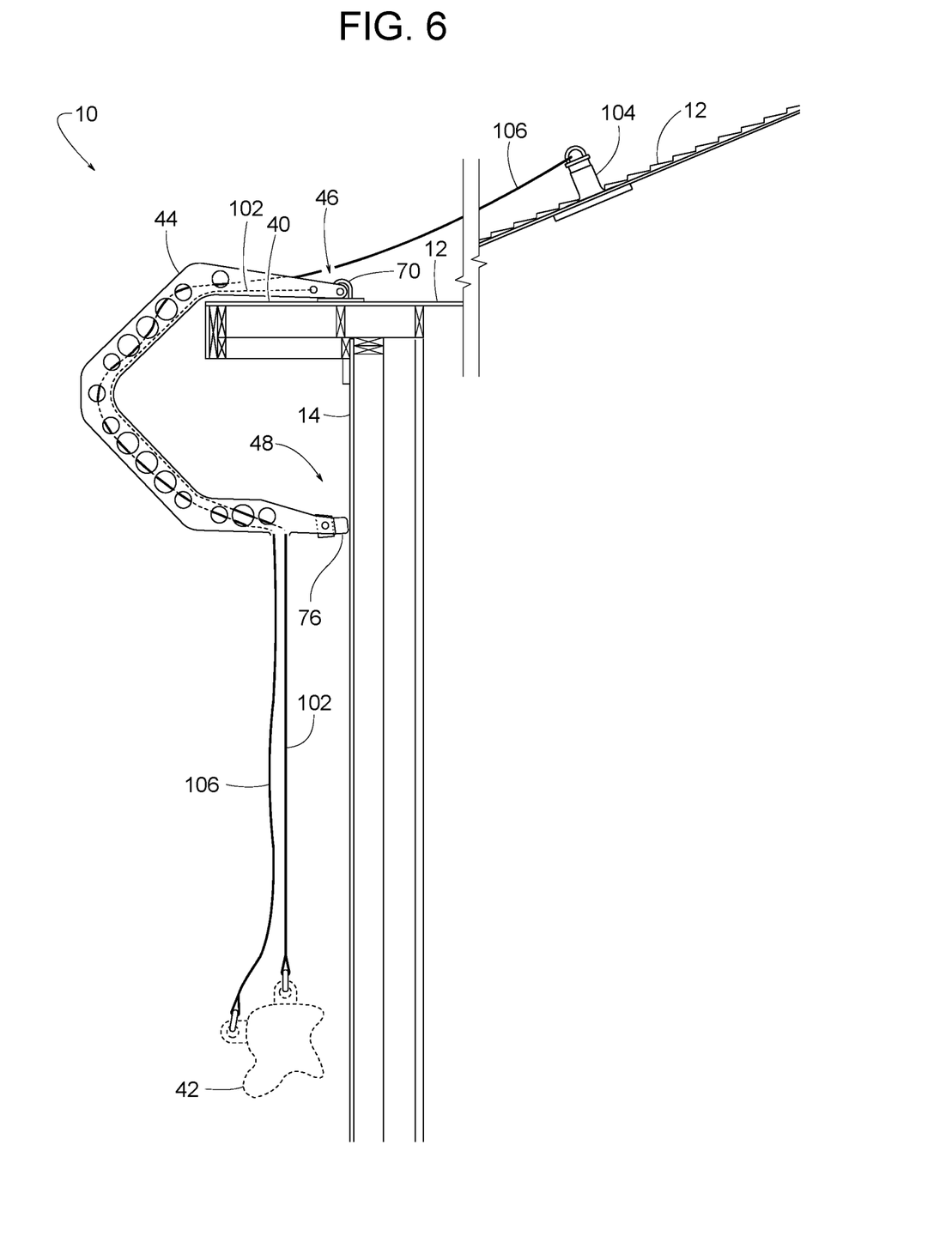
FIG. 6 shows the example rooftop rigging support system of FIG. 1 but showing the arm mounted to a generally level portion of the roof.

In some embodiments, the rooftop rigging support system 10 comprises a body or arm 44 having a proximal end 46 and a distal end 48 such that when the proximal end 46 is anchored to the roof 12, as shown in FIGS. 1 and 6, the arm 44 extends over the eave 28, the arm 44 extends under the eave 28, and the distal end 48 is underneath the eave 28.

Figure 3:
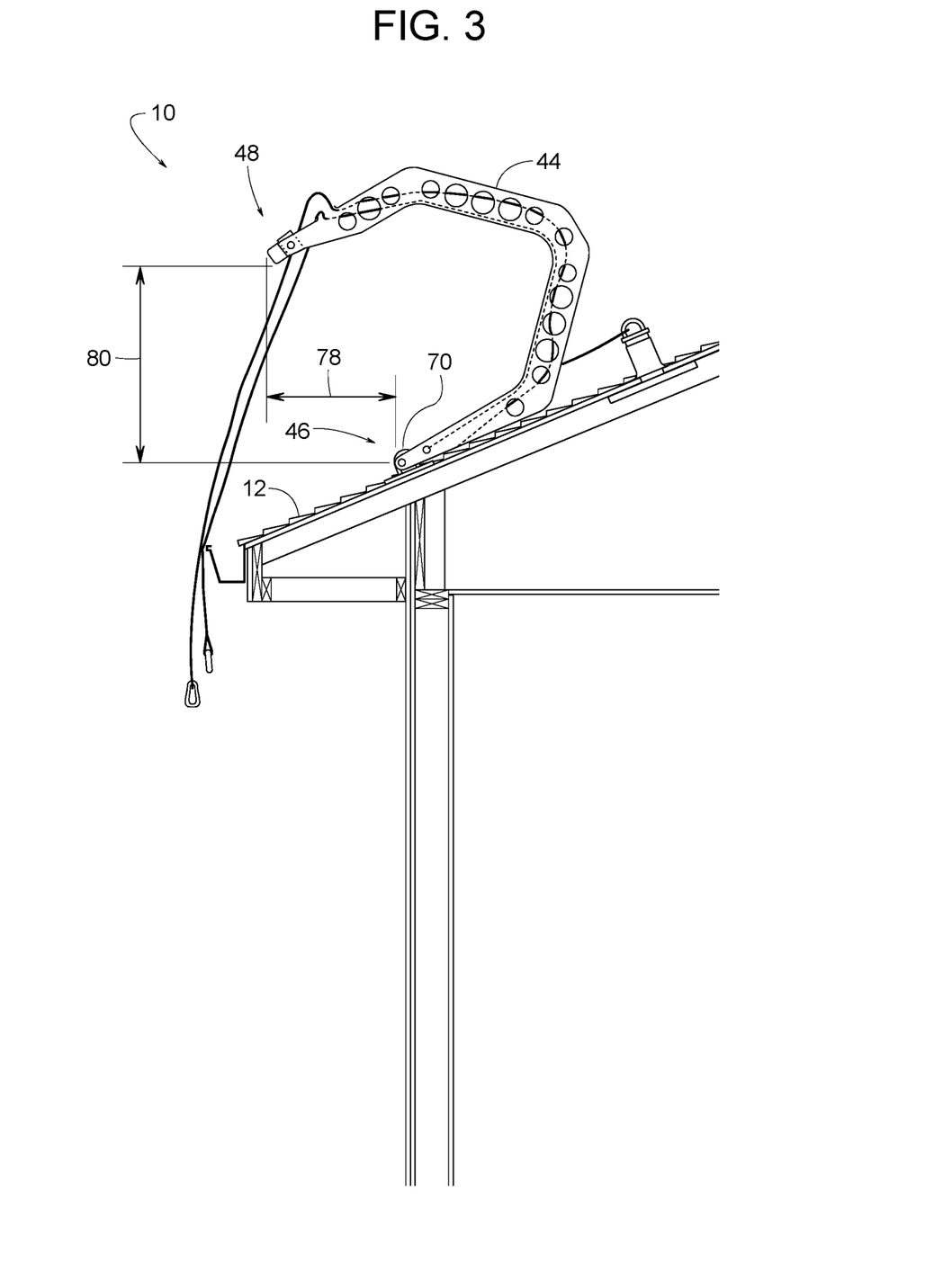
FIG. 3 shows the example rooftop rigging support system of FIG. 1 but showing the arm in a withdrawn position.

In some embodiments, the arm 44 has selectively a deployed position (e.g., as shown in FIGS. 1 and 6) and a withdrawn position (e.g., as shown in FIG. 3). In some embodiments, the distal end 48 is lower than the proximal end 46 when the arm 44 is in the deployed position. In some embodiments when the arm 44 is in the deployed position, the distal end 48 is at a first horizontal distance 50 from the proximal end 46, the distal end is at a first vertical distance 52 from the proximal end 46, and the first vertical distance 52 is at least three times greater than the first horizontal distance 50.

Figure 4:
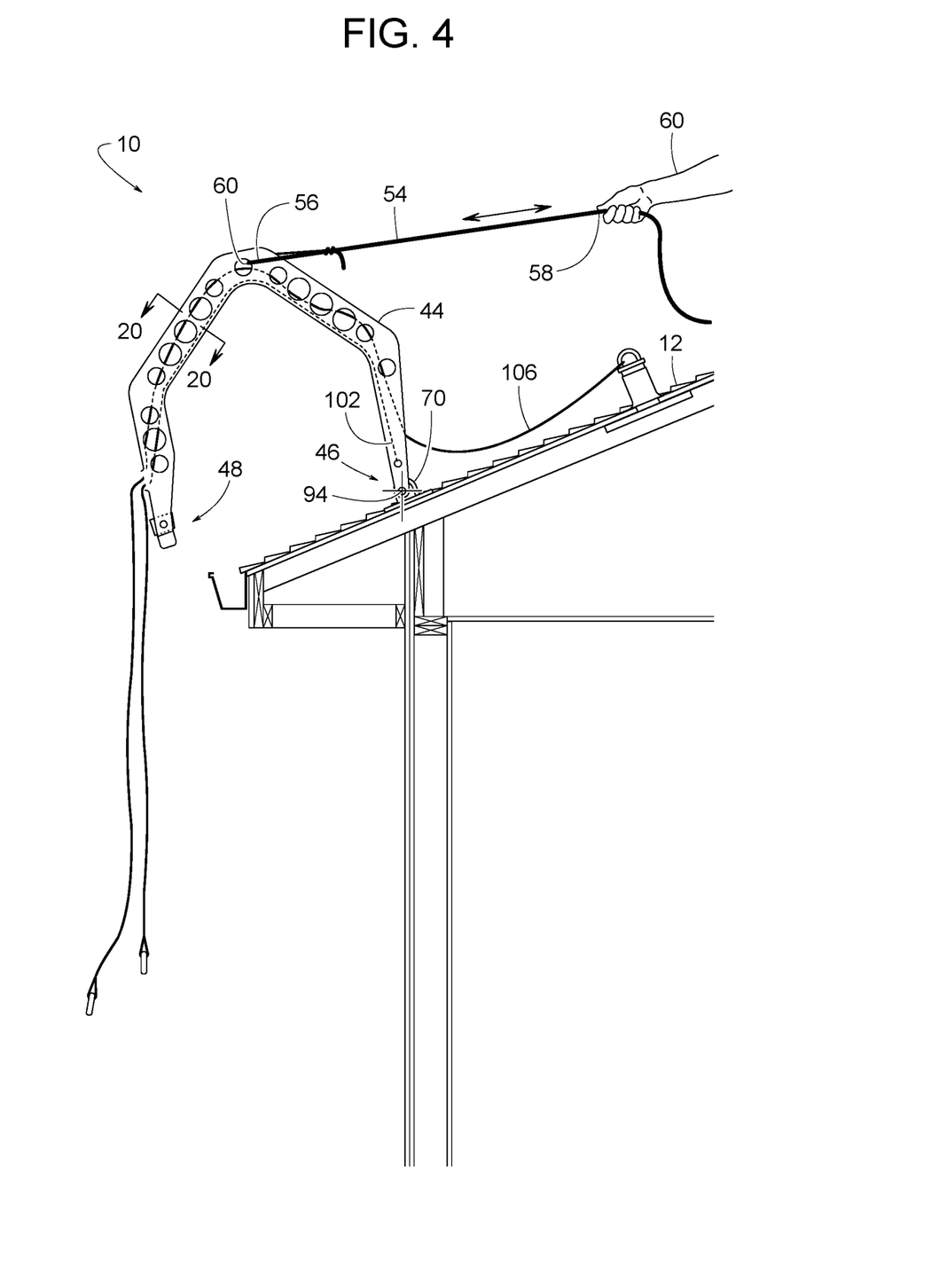
FIG. 4 shows the example rooftop rigging support system of FIG. 1 but showing the arm being raised or lowered from an intermediate position.

Some embodiments comprise an elongate pulling member 54 attached to arm 44 to assist in moving arm 44 between its deployed and withdrawn positions, e.g., as shown in FIG. 4. Some embodiments of elongate pulling member 54 comprise an attachment end 56 and a manual gripping end 58. In some embodiments, the attachment end 56 engages the arm 44 at an intermediate point 60 between the proximal end 46 and the distal end 48. In some embodiments, the manual gripping end 58 is accessible by a person 60 to manually grip the manual gripping end 58 at an elevation that is higher than that of the proximal end 46 when the proximal end 46 is anchored to the roof 12.

Figure 7:
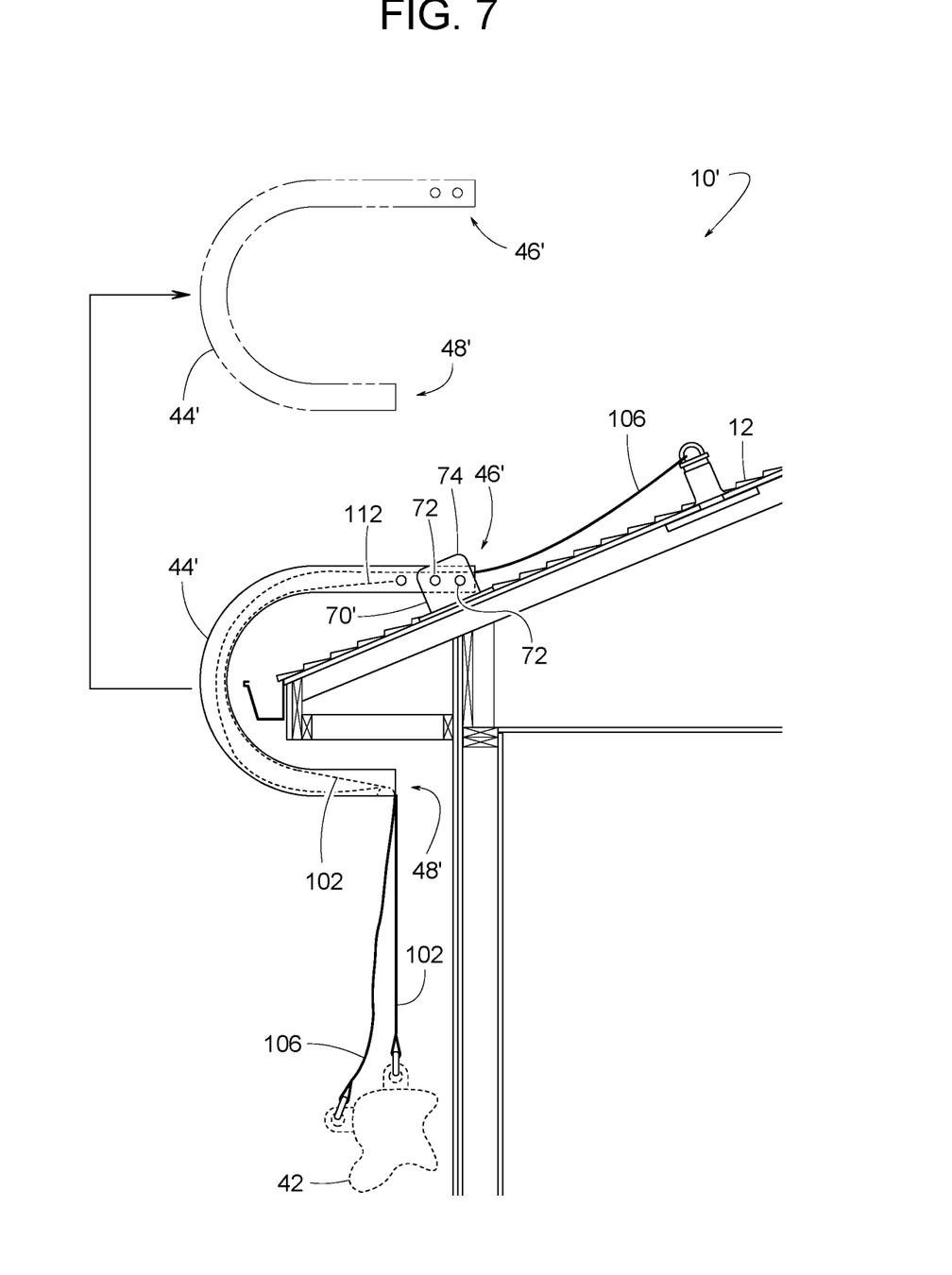
FIG. 7 shows an embodiment of another rooftop rigging support system similar to the one shown in FIG. 1 but with the arm being of a slightly different shape and attached to an example suspension anchor via a moment connection such that a distal end of the arm is held spaced apart from the building's wall.
Figure 19:
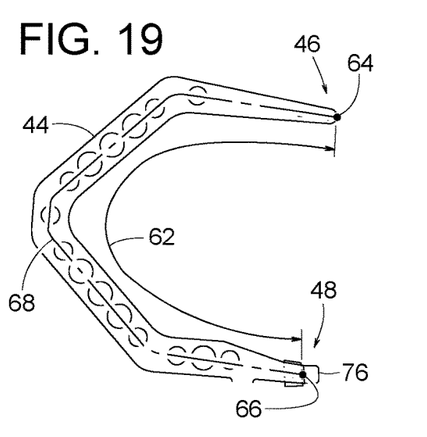
FIG. 19 shows the example arm of FIG. 1 and further showing a longitudinal centerline of the arm and identifying the arm's length along that centerline.

In some embodiments, as shown in FIG. 19, the arm 44 is substantially rigid and non-articulating along a full length 62 of the arm 44 from a first point 64 at the proximal end 46 to a second point 66 at the distal end 48, wherein the full length 62 is measured along a longitudinal centerline 68 of the arm 44. In some embodiments, the arm 44 is substantially rigid and non-articulating by virtue of the arm 44 being a welded fabricated structure. In some embodiments, an arm 44' is substantially rigid and non-articulating by virtue of the arm 44' being a unitary, monolithic tube, as shown in FIG. 7. In some embodiments, arm 44' comprises a tube having a rectangular cross-section. In some embodiments, arm 44' comprises a tube having a round cross-section.

Still referring to FIG. 7, in some embodiments, as shown in FIG. 7, a rooftop rigging support system 10' comprises an example suspension anchor 70' attachable to the roof 12. In this example, a proximal end 46' of the arm 44' is connected to the suspension anchor 70' in a more rigid configuration that provides a moment connection between the suspension anchor 70' and the arm 44' when the arm 44' is in the deployed position (arm 44' shown in solid lines). The arm 44' is separated and spaced apart from the suspension anchor 70' when the arm 44' is in the withdrawn position (arm 44' shown in phantom lines). In some embodiments, two pins 72 coupling the arm 44' to the suspension anchor 70' provide the moment connection between the arm 44' and the suspension anchor 70'. In the example illustrated in FIG. 7, suspension anchor 70' comprises at least one plate 74 with two holes for receiving the two pins 72.

In some embodiments, a bumper pad 76 at the arm's distal end 48 engages the building's wall 16 when the arm 44 is deployed (e.g., as shown in FIG. 1). In some embodiments, arm 44 comprises bumper pad 76. Some embodiments of bumper pad 76 are softer than the main body of arm 44. Some example materials of bumper pad 76 include polyurethane, neoprene, rubber, polyethylene, plastic, and nylon. In some embodiments, as shown in FIG. 7, a distal end 48' of the example arm 44' is spaced apart from the building's wall 16 when the arm 44' is in the deployed position.

In some embodiments when the arm 44 is in the withdrawn position (e.g., FIG. 3), the distal end 48 is higher than the proximal end 46. In some embodiments, the arm 44' (e.g., FIG. 7) is disconnected and separated from the roof 12 when the arm 44' is in the withdrawn position. In some embodiments when the arm 44 is in the withdrawn position, as shown in FIG. 3, the distal end 48 is at a second horizontal distance 78 from the proximal end 46, the distal end 48 is at a second vertical distance 80 from the proximal end 46, and the second horizontal distance 78 is less than the second vertical distance 80.

In some embodiments when the arm is in the deployed position (e.g., FIG. 1), at least a portion 90 of the arm 44 extends a third horizontal distance 92 from the proximal end 46, and the third horizontal distance 92 is at least three times greater than the first horizontal distance 50. In some embodiments, the relationship of the various distances 50, 52, 78, 80, and 92 are such that the arm 44 can reach around the eave 28 without creating an undo rotational moment about proximal end 46 as the load 42 exerts a downward force on the distal end 48.

Figure 2:
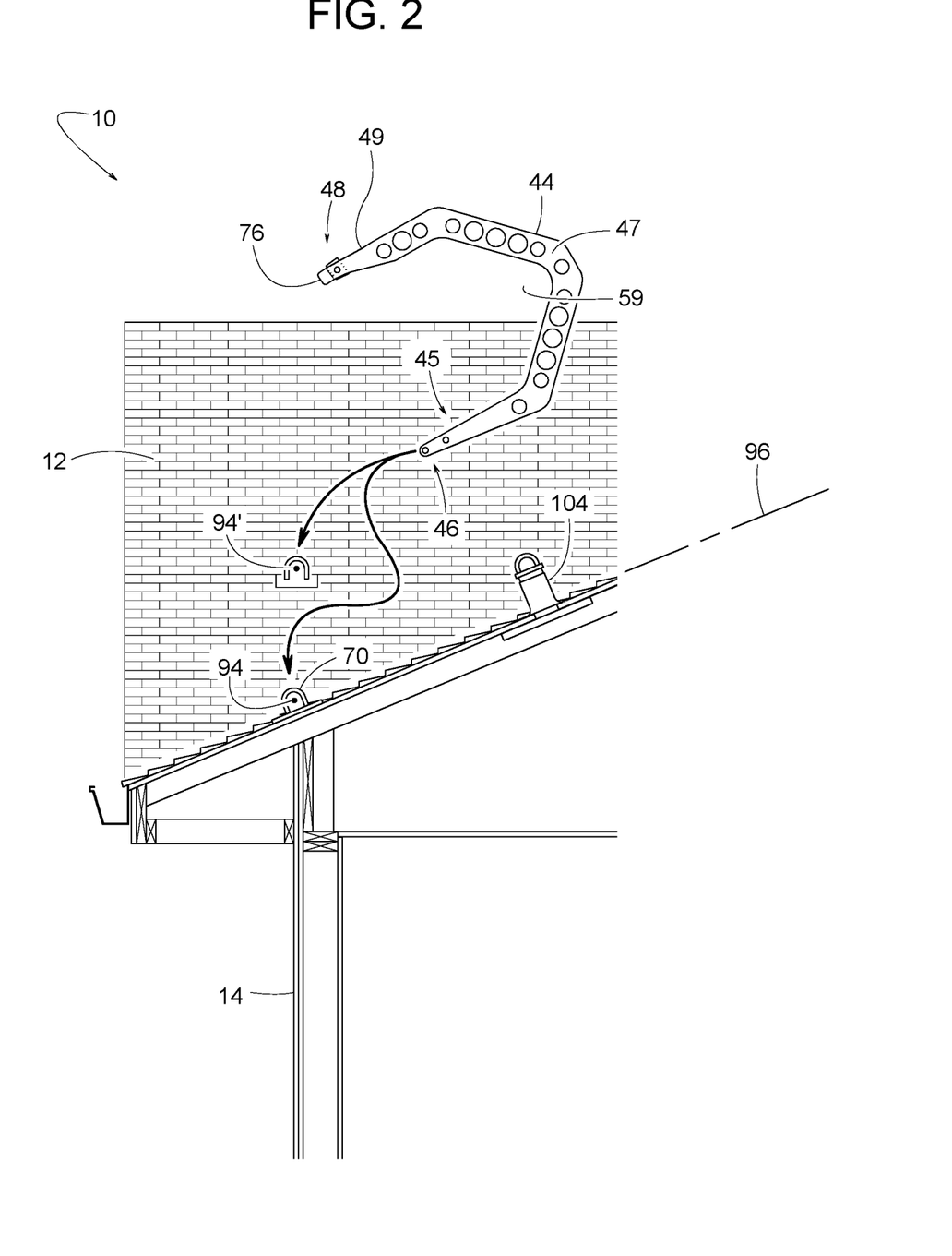
FIG. 2 shows an embodiment of a rooftop rigging support system with its arm about to be mounted to one of two suspension anchors attached to a roof of a building.
Figure 8:
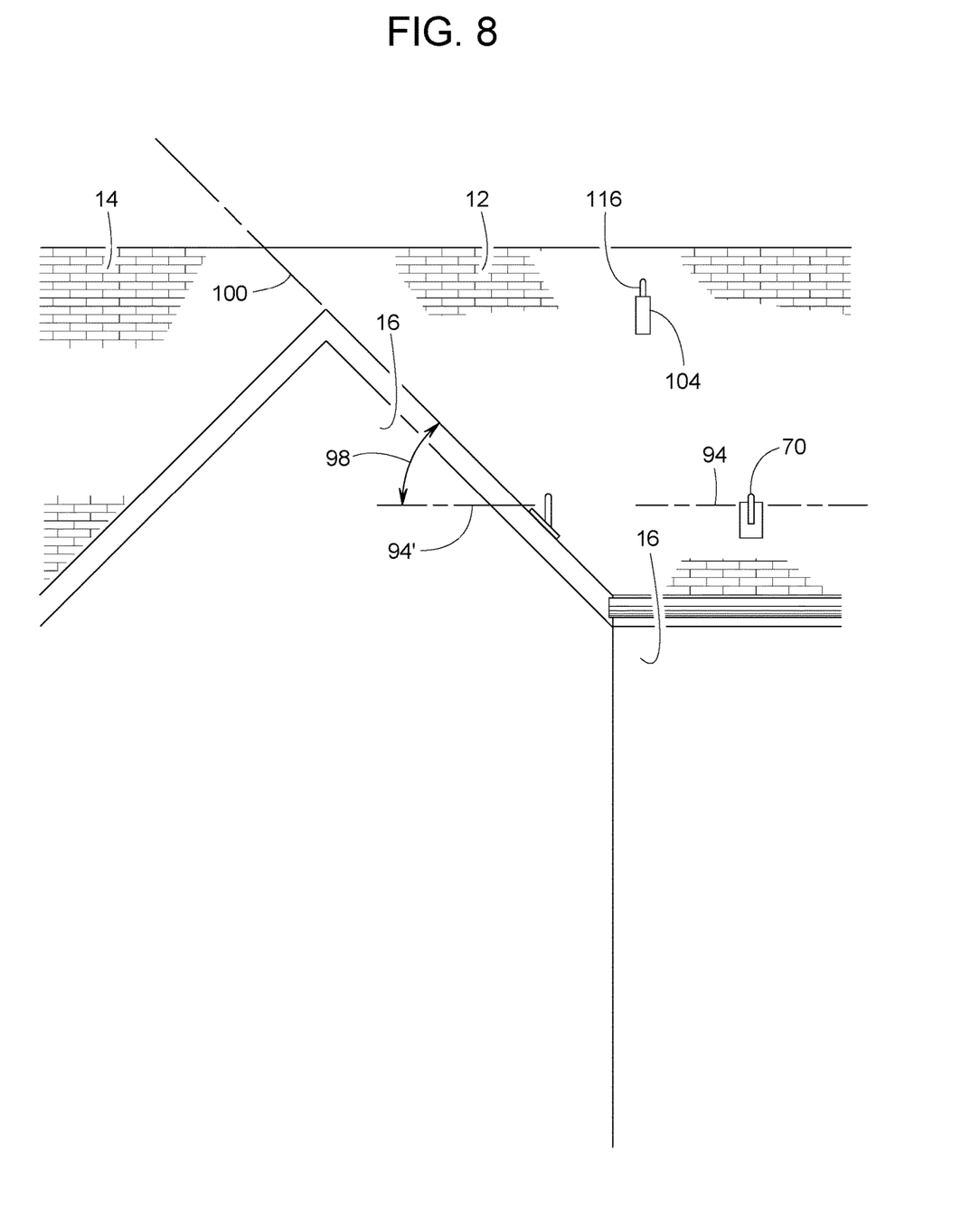
FIG. 8 shows one embodiment of a lifeline anchor and two embodiments of suspension anchors mounted at different locations on the building's roof.
Figure 9:
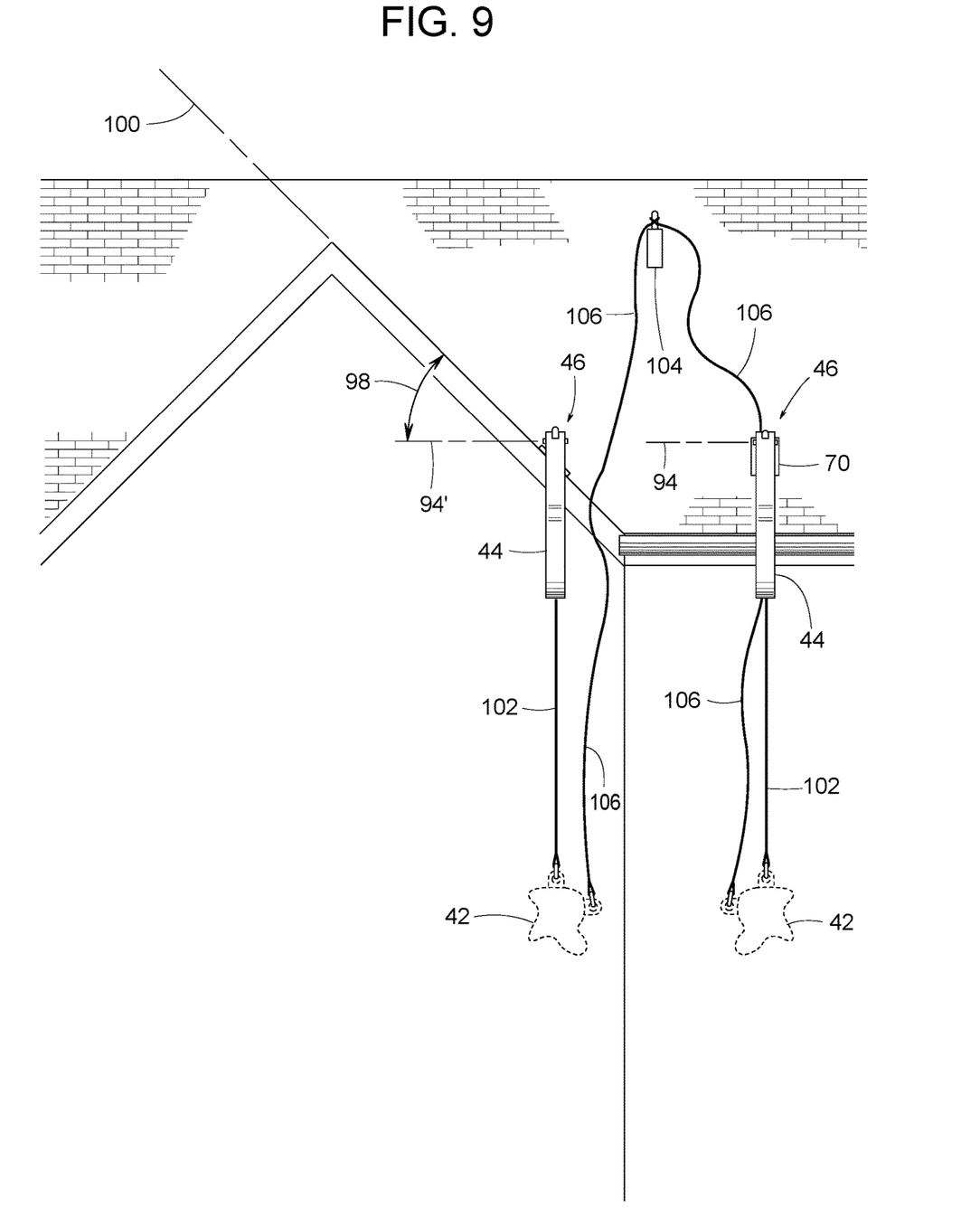
FIG. 9 shows the embodiments of arms, suspension lines, and lifelines connected to various example anchors, wherein the anchors are also shown in FIG. 8.
Figure 10:
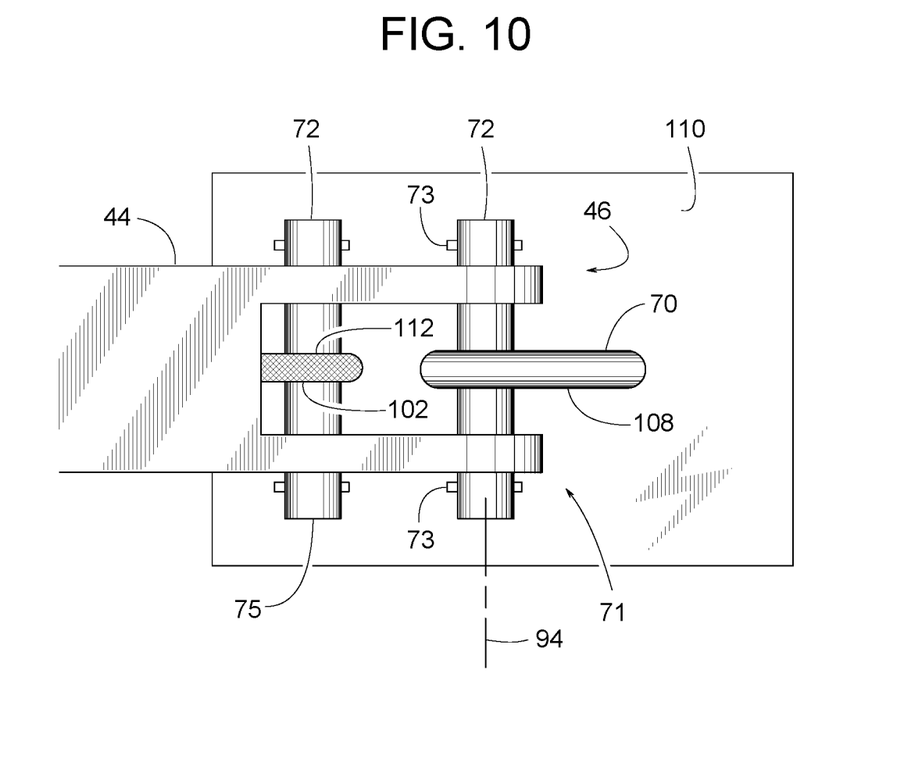
FIG. 10 is a top view showing an embodiment of an arm's proximal end pinned to an example suspension anchor.
Figure 11:
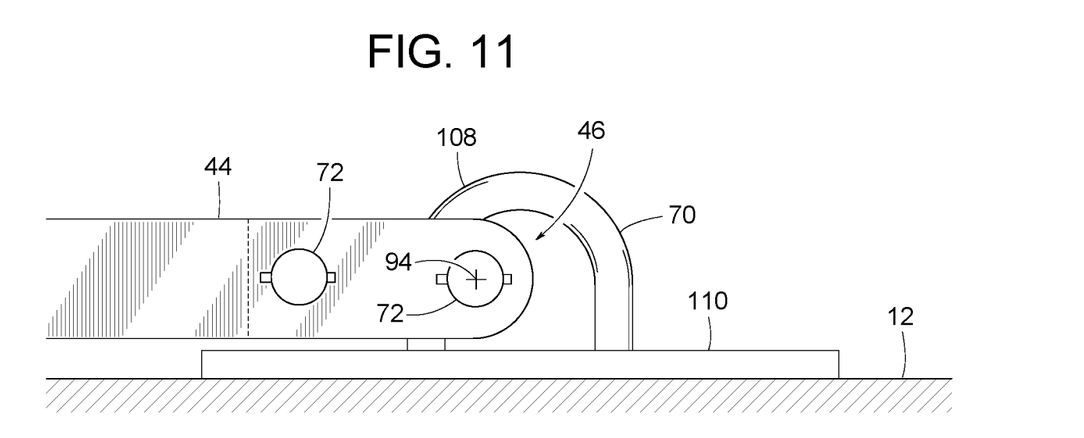
FIG. 11 shows a side view of FIG. 10.
Figure 12:
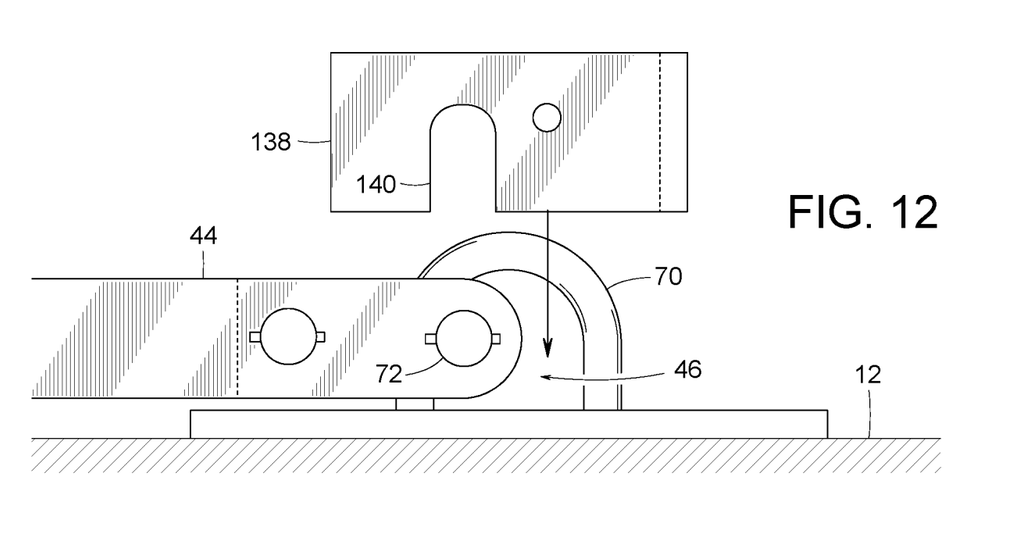
FIG. 12 is a side view similar to FIG. 11 but showing an embodiment of a bracket being lowered onto an example suspension anchor.
Figure 13:
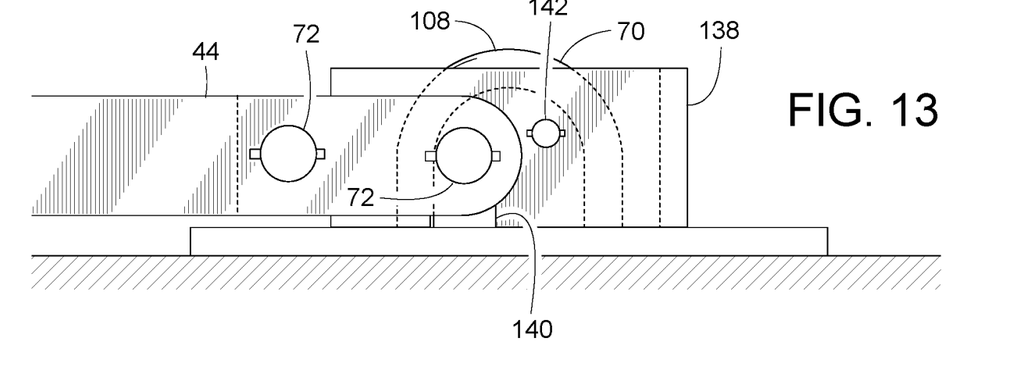
FIG. 13 is a side view similar to FIG. 12 but showing the example bracket having already been lowered onto the example suspension anchor.
Figure 14:
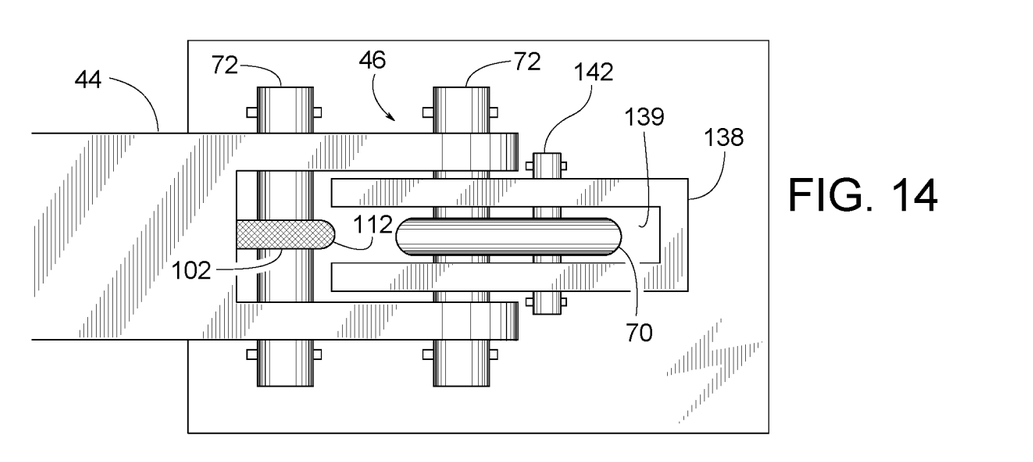
FIG. 14 shows a top view of FIG. 13.

In some embodiments, the arm 44 is movable between its deployed and withdrawn positions by virtue of the arm 44 being pivotal about a substantially horizontal axis 94. In some embodiments, as shown in FIGS. 2, 4, 8, 9, 10, and 11; the substantially horizontal axis 94 is substantially parallel to an inclined plane 96 defined by the roof 12. In some embodiments, as shown in FIGS. 2, 8, and 9; the substantially horizontal axis 94' is at an obtuse angle 98 to an inclined plane 100 defined by the roof 12.

In some embodiments, the rooftop rigging support system 10 includes at least one of a suspension anchor 70, a suspension line 102, a lifeline anchor 104, and a lifeline 106. In some embodiments, the suspension anchor 70 is attachable to the roof 12, and the proximal end 46 of the arm 44 is connected to the suspension anchor 70. In some examples, the suspension anchor 70 comprises a metal loop 108 welded to a base plate 110. In some examples, the base plate 110 is fastened to the roof sheathing 24. In some embodiments, a pin 72 extends through the metal loop 108 to pivotally connect the arm's proximal end 46 to the suspension anchor 70. In some embodiments, the suspension anchor 70 is mounted to the roof 12 such that suspension anchor 70 and the arm's proximal end 46 are generally directly above the building's exterior wall 16. Such a location may provide greater mounting strength, minimize rotational torque that load 42 might apply to the arm 44, and/or minimize the pressure the pad 76 might apply against the wall 16.

In some embodiments, the suspension line 102 comprises a pliable elongate member extending between an upper end 112 and a lower end 114. Some examples of suspension line 102 include a natural fabric rope, a synthetic rope, a wire rope, a cable, a strap, a chain, and various combinations thereof. Some example materials of suspension line 102 include metal, plastic, natural fiber, stainless steel, galvanized steel, carbon fibers, KEVLAR (Kevlar is a registered trademark of DuPont of Wilmington, Del.), and various combinations thereof. In some embodiments, the suspension line's upper end 112 is attached to suspension anchor 70. In some embodiments, upper end 112 is attached to the proximal end 46 of arm 44. In some embodiments, a pin 72 connects the suspension line's upper end 112 to the arm's proximal end 46. In some embodiments, the suspension line's lower end 114 hangs below the arm 44 to suspend the load 42 when the arm 44 is in the deployed position. In some embodiments, the suspension line 102 is what carries most of the weight of the hanging load 42.

Figures 17, 20:
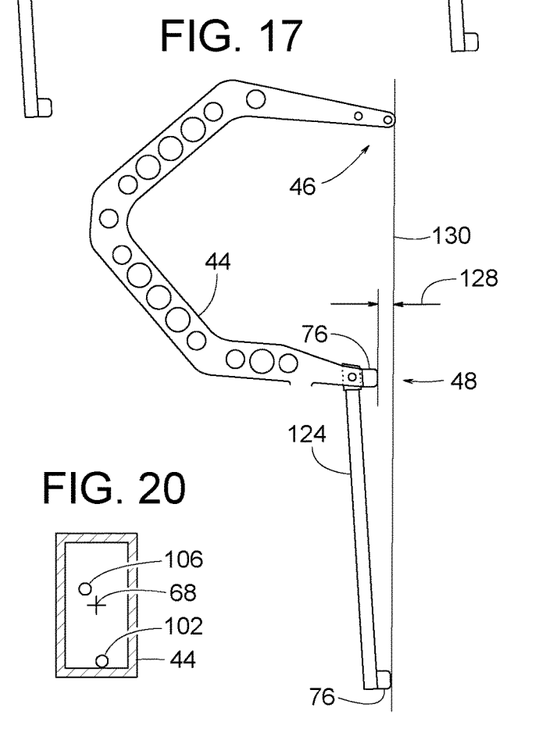
FIG. 17 is side view similar to FIG. 16 but showing additional features of the arm and extension bar.
FIG. 20 shows a cross-sectional view taken along line 20-20 of FIG. 4.

In some embodiments, the arm 44 is tubular and has a rectangular cross-section, as shown in FIG. 20. In some embodiments, the suspension line 102 extends through the arm 44. This can help protect the suspension line 102 from abrasion, can help properly position the suspension line 102 underneath eave 28, can help prevent tension in the suspension line 102 from damaging the gutter 36, and/or can help create a neat appearance.

In some embodiments, the lifeline anchor 104 is attachable to the building's roof 12. In some embodiments, the lifeline anchor 104 comprises a metal loop 116 welded to a post 118, which in turn is welded to a base plate 120. In some embodiments, the base plate 120 is fastened to the underside of the roof sheathing 24, and the post 118 protrudes up through the roof sheathing 24 and the shingles 26. In some embodiments, flashing 122 around the post 118 and underneath the shingles 26 helps prevent rain and melting snow from leaking through roof 12.

Figure 5:
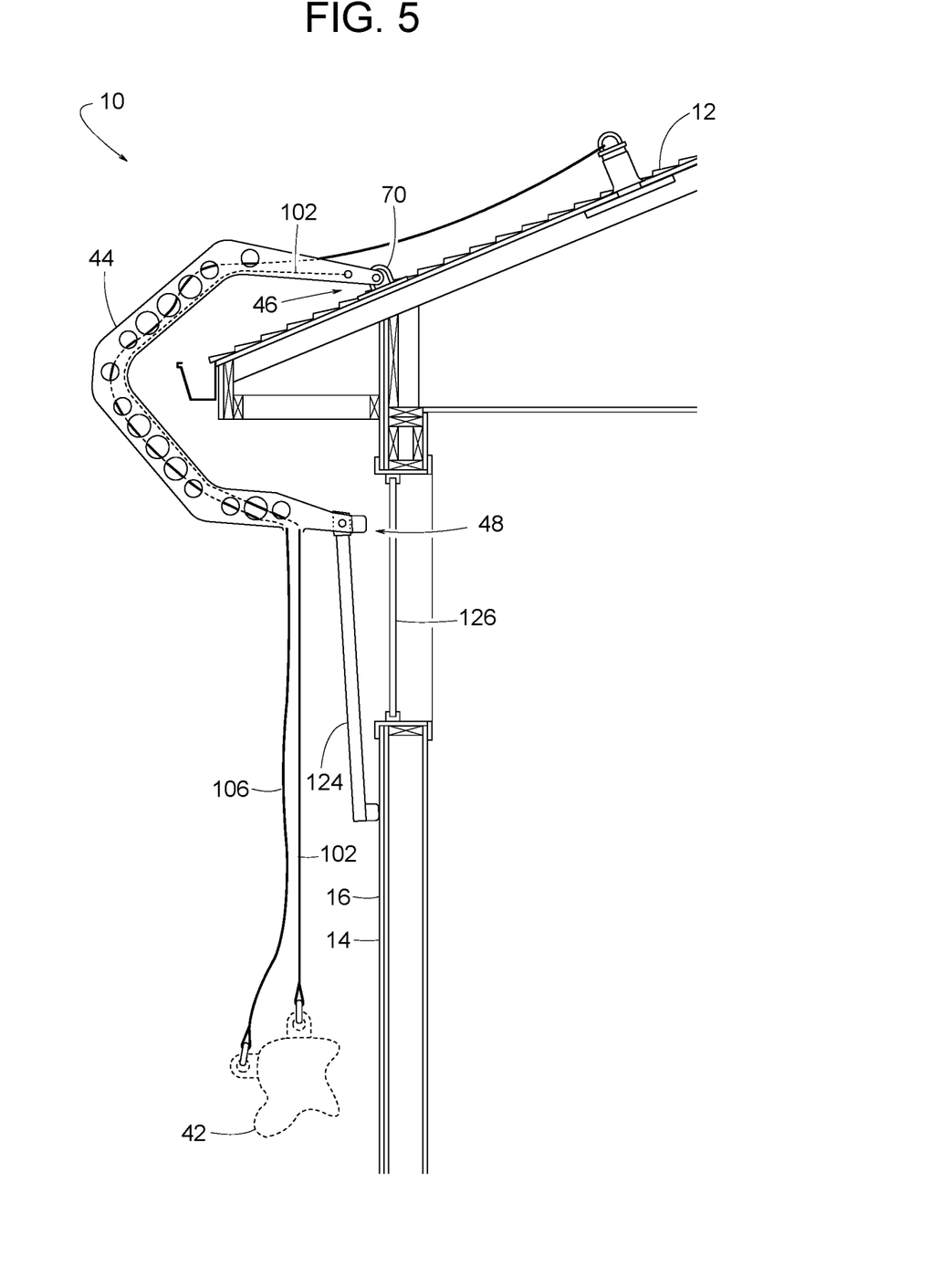
FIG. 5 shows an embodiment of a rooftop rigging support system similar to the one shown in FIG. 1 but with an example extension bar having been added to the arm's distal end.

Referring to FIGS. 5 and 15-18, in some embodiments, the rooftop rigging support system 10 comprises an extension bar 124 removably attached to the arm's distal end 48. In some embodiments, the extension bar 124 is lower than the arm's distal end 48 when the arm 44 is in the deployed position. In some embodiments, it is the extension bar 124, not the arm's distal end 48, that engages the wall 16 when the arm 44 is in the deployed position. In some examples, the extension bar 124 can be useful for engaging the wall 16 to avoid the arm's distal end 48 having to otherwise press against a window 126 that might happen to be at the same elevation, as shown in FIG. 5.

Referring to FIG. 17, in some embodiments, the arm's bumper pad 76 is at an offset distance 128 from a line 130 extending between proximal end 46 and a bumper pad 76 on extension bar 124. Offset distance 128 helps ensure that the arm's bumper pad 76 is spaced apart from the window 126 when the extension bar's bumper pad 76 engages the wall 16.

Figures 15, 18:
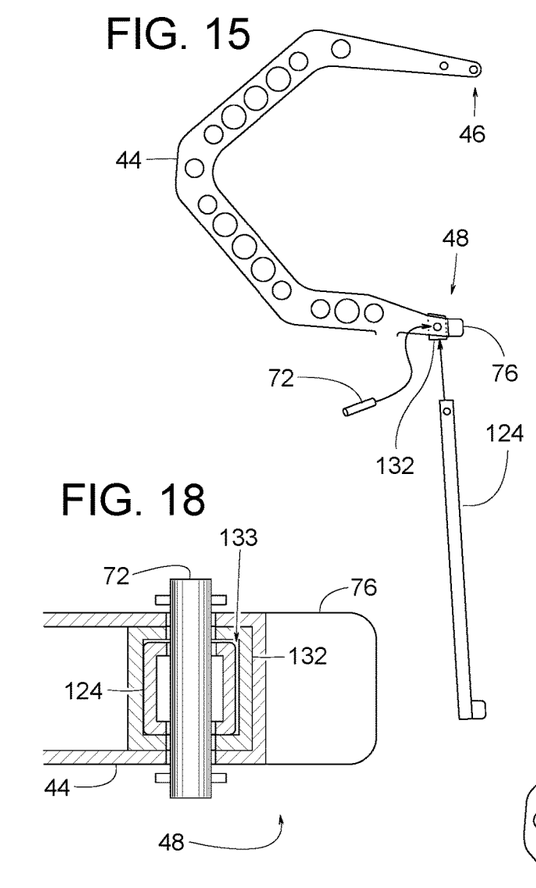
FIG. 15 is an exploded view showing an example extension bar being added to an example arm.
FIG. 18 shows a cross-sectional view taken along line 18-18 of FIG. 16.
Figure 16:
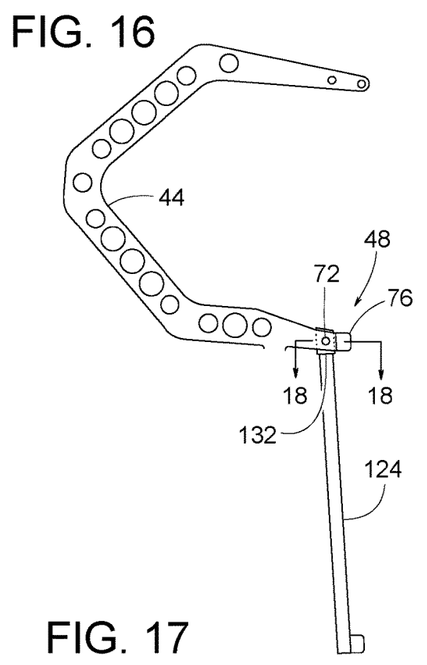
FIG. 16 is a side view similar to FIG. 15 but showing the extension bar attached to the distal end of the arm.

Some embodiments of the arm 44 comprise a sleeve 132, and the extension bar 124 is received in the sleeve 132. In some embodiments, the sleeve 132 comprises a non-circular cross-sectional shape and the extension bar 124 comprises a complimentary cross-section, as shown in FIG. 18. This allows the extension bar 124 to fit into the arm's sleeve 132 to create a moment connection between the two. In some embodiments, a pin 72 fastens the extension bar 124 to the arm's distal end 48.

In some embodiments, the lifeline 106 comprises a pliable elongate member extending between a first end 134 and a second end 136 of lifeline 106. Some examples of lifeline 106 include a natural fabric rope, a synthetic rope, a wire rope, a cable, a strap, a chain, and various combinations thereof. Some example materials of lifeline 106 include metal, plastic, natural fiber, stainless steel, galvanized steel, carbon fibers, Kevlar, and various combinations thereof. In some embodiments, the lifeline's first end 134 connects to the lifeline anchor 104. In some embodiments, the lifeline's second end 136 hangs below the arm 44 and the eave 28 and connects to load 42. In some embodiments, the lifeline 106 is normally slack and serves as a backup safety device to prevent the load 42 from falling to the ground if the suspension line 102 were to fail in supporting the load 42. Thus, in some embodiments, the suspension line 102 is under greater tension than the lifeline 106 when the rooftop rigging support system 10 is suspending the load 42 under normal operation.

In some embodiments, the lifeline anchor 104 and the suspension anchor 70 are spaced apart from each other when the lifeline anchor 104 and the suspension anchor 70 are attached to the roof 12. In some embodiments, the lifeline anchor 104 is attached to the roof 12 at a higher elevation than suspension anchor 70. In some embodiments, such a spaced apart relationship, as shown in FIG. 9, allows one lifeline anchor 104 to serve multiple deployed arms 44.

In some embodiments, the lifeline line 106 extends through the arm 44. This can help protect the lifeline 106 from abrasion, can help properly position the lifeline 106 underneath eave 28, can help prevent the lifeline 106 from damaging the gutter 36, and/or can help create a neat appearance. In some embodiments, the lifeline 106 is routed outside of the arm 44 (e.g., see FIG. 9).

Referring to FIGS. 10-14, some embodiments comprise a locking mechanism 138 such as a locking bracket that can be installed to help reduce the lateral clearance between the arm 44 and the loop 108 on suspension anchor 70. Although extra lateral clearance can make it easier to slip the arm's proximal end 46 over the loop 108 of suspension anchor 70, less lateral clearance can make it easier to control the movement of arm 44 as arm 44 is pivoted between the deployed and withdrawn positions. Some embodiments of the locking bracket 138 include a slot 140 that fits around the pin 72 that couples the arm's proximal end 46 to the suspension anchor 70. Slot 140 allows bracket 138 to be installed after the pin 72 connects the arm 44 to the suspension anchor 70. In some embodiments, a pin 142 helps hold the bracket 138 to suspension anchor 70.

In some embodiments, a body 44 comprises a first portion 45, a second portion 47 and a third portion 49. In some embodiments, the first portion 45 is arranged to engage an anchor 70. In some embodiments, the first portion 45 is arranged to engage a loop 108 of the anchor 70. In some embodiments, the first portion 45 comprises a bracket 71 with portions arranged to straddle the loop 108. In some embodiments, the first portion 45 comprises a pin 72 arranged to extend through the loop 108. In some embodiments, the pin 72 extends through portions of the bracket 71 located on either side of the loop 108. In some embodiments, the pin 72 comprises a locking member 73 arranged to prevent removal of the pin 72. In some embodiments, a locking member 73 comprises a locking pin. In some embodiments, a locking member 73 is provided to each side of the bracket 71.

In some embodiments, the third portion 49 is arranged to abut a wall of a building.

In some embodiments, the second portion 47 is offset from the first portion 45 and the third portion 49 and body 44 defines a cavity 59. The body 44 can be oriented to extend around an eave with the eave positioned in the cavity 59. In some embodiments, a height of the cavity 59 (e.g. between the first portion 45 and third portion 49) is less then a depth of the cavity 59. Various embodiments of a body 44 may comprises a cavity 59 of any suitable size and shape.

In some embodiments, the first portion 45 comprises an anchor 75 arranged to engage a suspension line 102. In some embodiments, the suspension line 102 is engaged with the second portion 47 of the body 44. In some embodiments, the body 44 routes the suspension line 102 around an eave. In some embodiments, the suspension line 102 is engaged with the third portion 49 of the body 44. In some embodiments, the third portion 49 supports the suspension line 102 and positions the suspension line 102 adjacent to the wall of a building.

In some embodiments, the body 44 is rotatably engaged with the anchor 70. In some embodiments, the body 44 can rotate about a pin 72. In some embodiments, a locking bracket 138 is used to engage the body 44 and anchor 70 and prevent rotation of the body 44 with respect to the anchor 70. In some embodiments, a locking bracket 138 comprises opposed sidewalls defining a first slot 139. In some embodiments, the loop 108 of the anchor 70 is positioned in the first slot 139. In some embodiments, the locking bracket 138 comprises a second slot 140 arranged to receive the pin 72. In some embodiments, the locking bracket 138 further comprises a locking pin 142 arranged to engage the locking bracket 138 and the anchor 70. In some embodiments, the locking pin 142 extends through the loop 108 of the anchor 70. In some embodiments, the first slot 139 extends orthogonal to the second slot 140.

In some embodiments, the body 44 comprises an extension 124. In some embodiments, the extension 124 comprises a bumper 76. In some embodiments, the extension 124 is attached to the third portion 49 of the body 44. In some embodiments, the third portion 49 comprises a cavity 133 and the extension 124 is oriented in the cavity 133. In some embodiments, the third portion 49 comprises a tubular member 132 comprising the cavity 133, and the extension 124 is oriented in the tubular member 132. In some embodiments, the cavity 133 and/or tubular member 132 comprise a non-circular cross-sectional shape and the extension 124 comprises a complimentary non-circular cross-sectional shape arranged to engage the cavity 133.

In some embodiments, a rooftop rigging support system is mountable to a roof of a building for suspending a load under an eave of the building. In some embodiments, the rooftop rigging support system comprises an arm having a proximal end and a distal end such that when the proximal end is anchored to the roof, the arm extends around and under the eave, and the distal end is underneath the eave.

In some embodiments, a rooftop rigging support system comprises an arm comprising a proximal end and a distal end. The proximal end is anchorable to the roof of a building. The arm has selectively a deployed position and a withdrawn position while the proximal end is anchored. In the deployed position, the arm extends over the eave and under the eave. In the withdrawn position, the distal end of the arm is higher than the proximal end.

In some embodiments, in the deployed position, the distal end is at a first horizontal distance from the proximal end. The distal end is at a first vertical distance from the proximal end. The first vertical distance is at least three times greater than the first horizontal distance, and the distal end is lower than the proximal end. In some embodiments, in the withdrawn position, the distal end is at a second horizontal distance from the proximal end. The distal end is at a second vertical distance from the proximal end and the second horizontal distance is less than the second vertical distance.

In some embodiments, at least a portion of the arm extends a third horizontal distance from the proximal end when the arm is in the deployed position, and the third horizontal distance is at least three times greater than the first horizontal distance.

In some embodiments, the rigging system comprises a suspension line having an upper end and a lower end. The upper end is attached to at least one of the arm and the suspension anchor. The lower end hangs below the arm when the arm is in the deployed position.

In some embodiments, the rigging system comprises a lifeline arranged for attachment to a lifeline anchor. In some embodiments, a lifeline can extend alongside a suspension line in the arm and below the arm.

In some embodiments, a suspension line and a lifeline/fall protection line are routed around an eave by the rigging system.

In some embodiments, a rigging support system comprise a suspension anchor attached to a roof. In some embodiments, a suspension anchor comprises a loop and the arm is engaged with the loop.

In some embodiments, a proximal end of the arm is connected to the suspension anchor in a rigid configuration that provides a moment connection between the suspension anchor and the arm.

The above disclosure is intended to be illustrative and not exhaustive. This description will suggest many variations and alternatives to one of ordinary skill in this field of art. All these alternatives and variations are intended to be included within the scope of the claims where the term "comprising" means "including, but not limited to." Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A rigging comprising:
a body comprising a first portion, a second portion and a third portion, the first portion arranged to engage an anchor, the anchor fixedly attached to a building, the anchor comprising a loop defining a cavity, the first portion comprising a pin extending through the loop, a portion of the pin oriented in the cavity, the third portion arranged to contact the building, the second portion offset from the first portion and the third portion, the body comprising a cavity between the first portion and the third portion; and
a suspension line attached to the body, the suspension line extending away from the body.

2. The rigging of claim 1, the first portion arranged to rotatably engage the anchor.

3. The rigging of claim 1, comprising a locking member arranged to lock the pin to the body.

4. The rigging of claim 1, comprising a locking bracket arranged to engage the body and the anchor.

5. The rigging of claim 4, the locking bracket comprising a slot, the pin oriented in the slot.

6. The rigging of claim 5, the locking bracket comprising a first portion located to a first side of the loop and a second portion located to a second side of the loop.

7. The rigging of claim 4, the locking bracket comprising a locking pin extending through the loop, a portion of the locking pin oriented in the cavity.

8. A rigging comprising:
a body comprising a first portion, a second portion and a third portion, the first portion arranged to engage an anchor, the anchor fixedly attached to a building, the anchor comprising a loop defining a cavity, the third portion arranged to contact the building, the second portion offset from the first portion and the third portion, the body comprising a cavity between the first portion and the third portion; and
a suspension line attached to the body, the suspension line engaged with the second portion of the body, the suspension line extending away from the body.

9. The rigging of claim 8, the suspension line engaged with the first portion of the body.

10. The rigging of claim 1, the body comprising a removable pin, the suspension line attached to the removable pin.

11. The rigging of claim 1, the third portion comprising a bumper, the body comprising a first material, the bumper comprising a second material softer than the first material.

12. The rigging of claim 1, further comprising a fall protection line engaged with the body.

13. The rigging of claim 1, the third portion arranged to contact a wall of the building, the wall located beneath the anchor.

14. The rigging of claim 1, the third portion comprising an extension member, the extension member comprising a bumper.

15. The rigging of claim 14, the extension member fixedly engaged with the body.

16. The rigging of claim 14, the body comprising a cavity comprising a non-circular shape, a portion of the extension member oriented in the cavity and comprising the non-circular cross-sectional shape.

17. The rigging of claim 16, comprising a pin arranged to engage the body and the extension member.

18. A rigging comprising:
an anchor fixedly attached to a building, the anchor located adjacent to an eave, the anchor comprising a loop; and
a body comprising a first portion, a second portion and a third portion, the first portion arranged to engage the loop, the first portion comprising a pin extending through the loop, the body rotatable with respect to the anchor about the pin, the second portion offset from the first portion and the third portion, the second portion arranged to extend around the eave, the third portion arranged to contact a wall below the eave; and
a suspension line attached to the body, the suspension line extending away from the body adjacent to the wall.

* * * * *